United States Patent
Elogeel et al.

(10) Patent No.: US 12,001,175 B2
(45) Date of Patent: Jun. 4, 2024

(54) LONG TAIL LIDAR 3-D OBJECT DETECTION IMPROVEMENT WITH TARGETED SIMULATION DATA INJECTION

(71) Applicant: GM CRUISE HOLDINGS LLC, San Francisco, CA (US)

(72) Inventors: Abdelrahman Elogeel, Sunnyvale, CA (US); Andres Hasfura, San Antonio, TX (US); Alexander Pon, San Francisco, CA (US); Debanjan Nandi, Fremont, CA (US); Carden Bagwell, San Francisco, CA (US); Marzieh Parandehgheibi, San Francisco, CA (US); Teng Liu, Jersey City, NJ (US)

(73) Assignee: GM Cruise Holdings LLC, San Francisco, CA (US)

( * ) Notice: Subject to any disclaimer, the term of this patent is extended or adjusted under 35 U.S.C. 154(b) by 220 days.

(21) Appl. No.: 17/556,561

(22) Filed: Dec. 20, 2021

(65) Prior Publication Data
US 2023/0195054 A1   Jun. 22, 2023

(51) Int. Cl.
*G05B 13/02* (2006.01)
*B60W 50/00* (2006.01)
*B60W 60/00* (2020.01)

(52) U.S. Cl.
CPC ..... *G05B 13/0265* (2013.01); *B60W 50/0098* (2013.01); *B60W 60/001* (2020.02);
(Continued)

(58) Field of Classification Search
CPC ............ G05B 13/0265; B60W 60/001; B60W 50/0098; B60W 2554/402;
(Continued)

(56) References Cited

U.S. PATENT DOCUMENTS 10,353,053 B2 *   7/2019   Rohani ................... G01S 7/417
11,164,051 B2 *   11/2021  Deegan .................... G06T 7/33
(Continued)

FOREIGN PATENT DOCUMENTS

EP    4250267 A1 *  9/2023  ........ B60W 60/0017
GB    2610809 A  *  3/2023  ............ B60W 50/00
(Continued)

*Primary Examiner* — Atul Trivedi
(74) *Attorney, Agent, or Firm* — Michael DiCato

(57) ABSTRACT

The subject disclosure relates to techniques for improving performance of a machine learning algorithm that at least receives data descriptive of a 3-D object and provides an output, where the 3-D object occurs infrequently in a training dataset. A process of the disclosed technology can include determining that the machine learning algorithm performed below a threshold performance score when receiving data descriptive of the 3-D object in a real-world scene, wherein the 3-D object is classified as a first type of object, creating at least one 3-D representation of the first type of object for use in a simulation, modifying a plurality of simulated scenes to include the at least one 3-D representation of the first type of object, and training the machine learning algorithm with the modified simulated scenes, whereby the machine learning algorithm has greater exposure to the first type of object.

19 Claims, 5 Drawing Sheets

(52) U.S. Cl.
CPC ............... *B60W 2050/0088* (2013.01); *B60W 2420/408* (2024.01); *B60W 2554/402* (2020.02); *B60W 2554/801* (2020.02); *B60W 2554/802* (2020.02)

(58) Field of Classification Search
CPC ..... B60W 2554/801; B60W 2554/802; B60W 2050/0088; B60W 2420/52
USPC .......................................................... 701/26
See application file for complete search history.

(56) References Cited

U.S. PATENT DOCUMENTS

| | | | |
|---|---|---|---|
| 2019/0049560 A1* | 2/2019 | Chattopadhyay | G01S 17/931 |
| 2019/0361100 A1* | 11/2019 | Abari | G01S 17/42 |
| 2019/0377351 A1* | 12/2019 | Phillips | B62D 15/025 |
| 2020/0184027 A1* | 6/2020 | Dolan | G01S 13/931 |
| 2020/0290620 A1* | 9/2020 | Al Qizwini | B60W 30/18163 |
| 2020/0293796 A1* | 9/2020 | Sajjadi Mohammadabadi | G06V 10/82 |
| 2021/0078600 A1* | 3/2021 | Price | G01C 21/3407 |
| 2021/0166474 A1* | 6/2021 | Behar | G06F 30/20 |
| 2021/0191407 A1* | 6/2021 | Benisch | G05D 1/0219 |
| 2021/0201145 A1* | 7/2021 | Pham | G06N 3/08 |
| 2021/0253128 A1* | 8/2021 | Nister | G06N 7/01 |
| 2021/0279640 A1* | 9/2021 | Tu | G06V 10/82 |
| 2021/0303922 A1* | 9/2021 | Tu | G01S 17/894 |
| 2021/0309248 A1* | 10/2021 | Choe | G06N 3/04 |
| 2021/0347378 A1* | 11/2021 | Nabatchian | G06V 20/56 |
| 2021/0406560 A1* | 12/2021 | Park | G06T 7/70 |
| 2022/0297706 A1* | 9/2022 | Nilsson | B60W 60/00 |
| 2023/0032669 A1* | 2/2023 | Velankar | G06N 3/08 |
| 2023/0110713 A1* | 4/2023 | Degirmenci | G06N 3/0442 701/24 |
| 2023/0186640 A1* | 6/2023 | Kocamaz | G06V 10/454 382/104 |
| 2024/0001957 A1* | 1/2024 | Choe | B60W 50/06 |

FOREIGN PATENT DOCUMENTS

| | | | | |
|---|---|---|---|---|
| KR | 20210098187 A | * | 8/2021 | G01S 7/4861 |
| WO | WO-2021155223 A1 | * | 8/2021 | B60W 60/00272 |
| WO | WO-2021188541 A1 | * | 9/2021 | B60W 60/00 |

* cited by examiner

LONG TAIL LIDAR 3-D OBJECT DETECTION IMPROVEMENT WITH TARGETED SIMULATION DATA INJECTION

BACKGROUND

1. Technical Field

The subject technology pertains to improving long tail 3-D object detection by targeted simulation data injection and in particular, the subject technology pertains to creating data associated with 3-D objects from a real-world scene, modifying the simulated scenes by injecting the data associated with the 3-D objects into simulated scenes, and training a machine learning algorithm based on the modified simulated scenes.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

The autonomous vehicles can leverage various machine learning models to operate safely and efficiently. These machine learning models require data to properly learn from. Obtaining real world data is limited by various factors including, but not limited to, time, cost, opportunities for autonomous vehicles to drive, etc. Due to these limiting factors, real world data may not be as common as needed. In other words, it may not be feasible to acquire enough real world data to adequately train some machine learning models.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
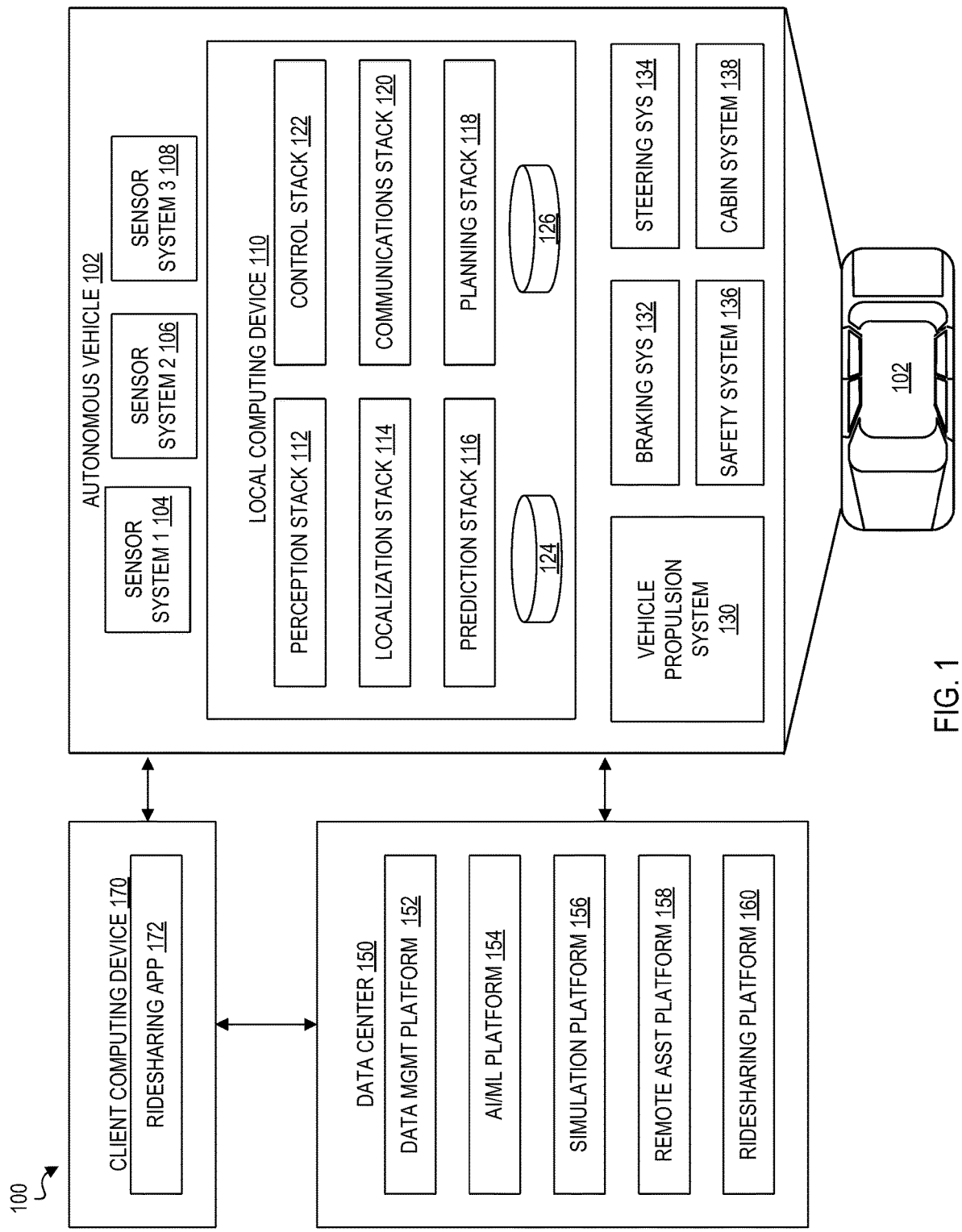
FIG. 1 illustrates an example of a system for managing one or more Autonomous Vehicles (AVs) in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

The autonomous vehicles can leverage various machine learning models to operate safely and efficiently. These machine learning models require data to properly learn from. Obtaining real world data is limited by various factors including, but not limited to, time, cost, opportunities for autonomous vehicles to drive, etc. Due to these limiting factors, real world data may not be as common as needed. In other words, it may not be feasible to acquire enough real world data to adequately train some machine learning models.

In particular, some long tail objects or rare objects may not occur frequently enough in the real world to provide enough data to train machine learning models to detect, identify, and/or react to the rare objects.

An aspect of the present technology addresses this problem by leveraging simulated data to augment a total amount of data to train machine learning models. However, simply utilizing simulated data can pose challenges. More specifically, real world data is commonly used because the goal of training machine learning models is for autonomous vehicles to operate properly in the real world. While similar, simulated data can, in some scenarios, cause unexpected differences in perception and/or detection of objects. Thus, the present technology suggests injecting real-world data of objects into simulation data to improve simulated data. In some embodiments, the simulation data can be real-world scenes recreated in simulation. For example, real-world data of a dumpster recorded by a sensor of an autonomous vehicle can be stored and used to improve simulation data. The real-world data of the dumpster can be injected into simulated scenes, so that simulated sensors can perceive the simulated scene with a simulated 3-D object based on the real-world data of the dumpster.

However simply adding simulated objects into a simulated scene can also pose challenges. More specifically, objects in the simulated scene should be positioned in locations and poses similar to those of the real world. For example, a bike rack in the middle of the road would be unlikely to occur in the real world. Thus, the present technology also provides solutions for proper placement these objects in simulated scenes by way of a placement system and/or placement data structure containing locations, poses, and associated probabilities of location and poses for each object.

Systems, methods, and computer-readable media are disclosed for improving performance of a machine learning algorithm that at least receives data descriptive of a 3-D object and provides an output, where the 3-D object occurs infrequently in a training dataset. Improvements to simulated scenes to more accurately correspond to the sensor performance in the real world can be used in simulations to train and evaluate the ML models. In some examples, the simulations can be used to create uncommon scenarios to evaluate the training and evaluation of updated ML models.

In some examples, a method for improving performance of a machine learning algorithm that at least receives data descriptive of a 3-D object and provides an output, where the 3-D object occurs infrequently in a training dataset is disclosed. The method comprises determining that the machine learning algorithm performed below a threshold performance score when receiving data descriptive of the 3-D object in a real-world scene, wherein the 3-D object is classified as a first type of object, creating at least one 3-D representation of the first type of object for use in a simulation, modifying a plurality of simulated scenes to include the at least one 3-D representation of the first type of object, and training the machine learning algorithm with the modified simulated scenes, whereby the machine learning algorithm has greater exposure to the first type of object.

Example Embodiments

Figure 2:
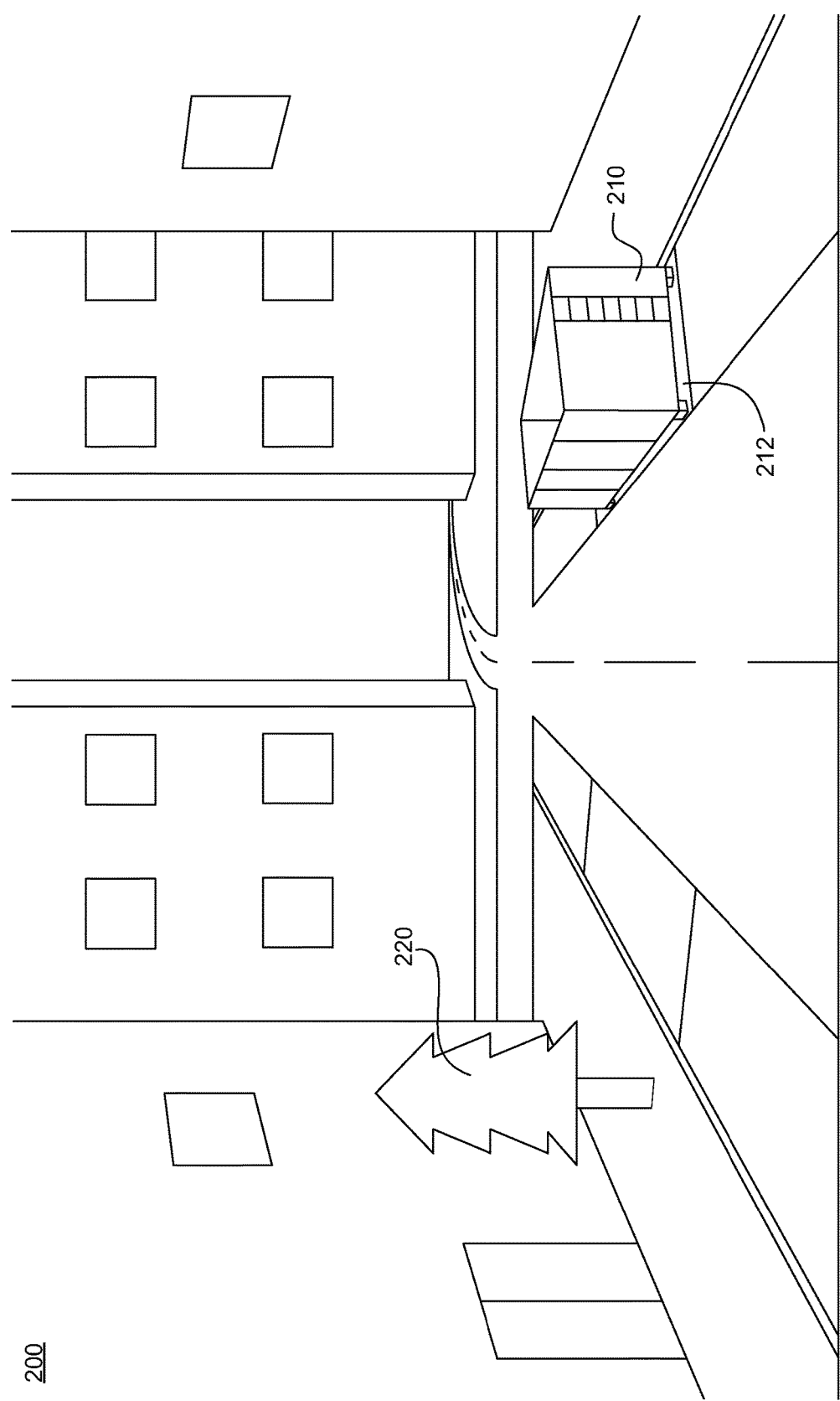
FIG. 2 illustrates an example scene in accordance with some aspects of the present technology.
Figure 5:
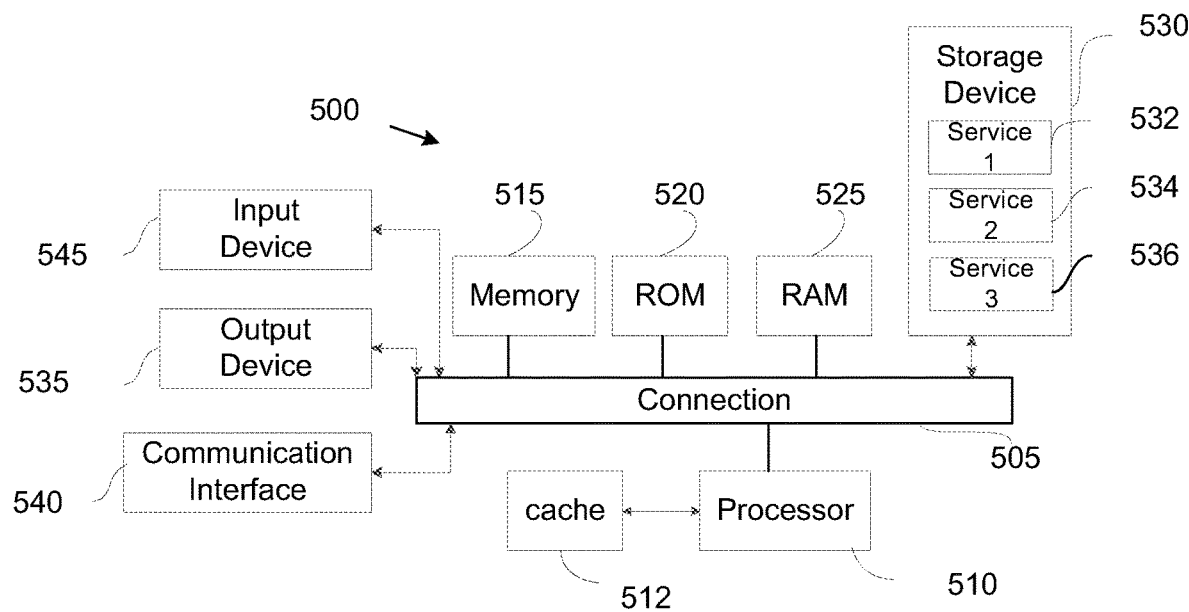
FIG. 5 shows an example of a system for implementing certain aspects of the present technology.

A description of an AV management system and an example scene, as illustrated in FIGS. 1 and 2, are first disclosed herein. An overview of a neural network lifecycle is disclosed in FIG. 3. A method for improving performance of a machine learning algorithm is disclosed in FIG. The discussion then concludes with a brief description of example devices, as illustrated in FIG. 5. These variations shall be described herein as the various embodiments are set forth. The disclosure now turns to FIG. 1.

FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes;

etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

FIG. 2 illustrates an example scene 200. Example scene 200 is illustrative of a real-world scene as perceived by sensors 104-108 of AV 102 as described above with respect to FIG. 1 and/or a simulated scene in a virtual world as perceived by a simulated sensor. In other words, scene 200 illustrates an example of a real-world scene and/or an example of a simulated scene in simulation. In some embodiments, simulated scenes are real-world scenes recreated in simulation.

Scene 200 can include one or more objects 210, 220 perceived by sensors 104-108 of AV 102 or a simulated sensor. Some objects appear less frequently in the real world. For example, rare objects 210, such as dumpsters, skateboards, scooters, trailers of trucks, etc., are less common in the real world. Rare objects 210 may have various reasons for their infrequency. For example, dumpsters may appear less frequently due to specified garbage days, during which the dumpsters are positioned in specific locations 212 (e.g., a parking spot, near a curb, on the sidewalk, etc.) on the specified garbage days. These rare objects 210 may be referred to as long-tail objects due to their relative infrequency in an object frequency distribution. Other objects can be more commonly found in the real world. For example, common objects 220, such as trees, pedestrians, vehicles, etc., can be found frequently in real-world scenes.

The scarcity of rare objects 210 reduces a total amount of data that can be used to train a machine learning model to properly detect and subsequently react to rare objects 210. Thus, it is a principle of the present technology to increase the total amount of data to include more data that includes rare objects 210. Accordingly, the increased total amount of data can be used to efficiently train a machine learning model.

More specifically, simulated data can be leveraged to increase the total amount of data that includes rare objects 210. While simulated data is similar to real-world data, real-world data is still utilized because the end goal of training machine learning models is to properly detect and react to objects in the real-world. To address this, data associated with and/or descriptive of a 3-D object in the real world, such as rare objects 210 in the real world, can be used in simulated scene. For example, data associated with and/or descriptive of rare object 210 can be simulated in simulated scene 200, thereby preserving the real-world nature of rare object 210, while also providing additional scenes and data to train a machine learning model.

Simply adding rare objects 210 into a simulated scene 200 can also create issues. For example, simply adding a dumpster in the middle of the road is unlikely to occur and would result in a biased model. Thus, another object of the present technology is determining how and where to place objects into simulated scenes. A placement system can be configured to have a probability associated with a placement of objects 210, 220 in specified location 212, such that when generating a particular simulated scene (e.g., scene 200), the placement system can utilize the probability associated with the placement of objects 210, 220 to determine specified location 212 to place objects 210, 220. Additionally, a placement database or data structure can store objects 210, 220 and object types or classifications along with the associated probability for placement. More specifically, each object 210, 220 may have various different locations that possible and/or probable. For example, a scooter can be on the road, on a sidewalk, in a bike lane, etc. Each of these various different locations can have an associated probability based on the object type. Thus, the data structure, in some embodiments, may be organized, at least in part, with object types serving as keys for accessing lists of possible and/or probable locations, with each location having an associated probability. Additionally, various poses and distances can be associated with each object. For example, dumpster 210 can be substantially parallel to the curb and in parking spot 212. In other words, the list of possible and/or probable locations can additionally serve as a criteria for placement of objects 210, 220.

In some embodiments, the placement system can use any technique for selecting a location and pose of an object 210, 220 to include in simulated scene 200. For example, the placement system can use a random selection algorithm to randomly select a location and pose for object 210, 220 from the list of possible and/or probable locations. In some embodiments, the selection of location can additionally or alternatively be based on the associated probability of the location. For example, it may be desired to create more data with dumpsters. The placement system can select a location for the dumpster based on the highest associated probability in the list of locations.

Figure 3:
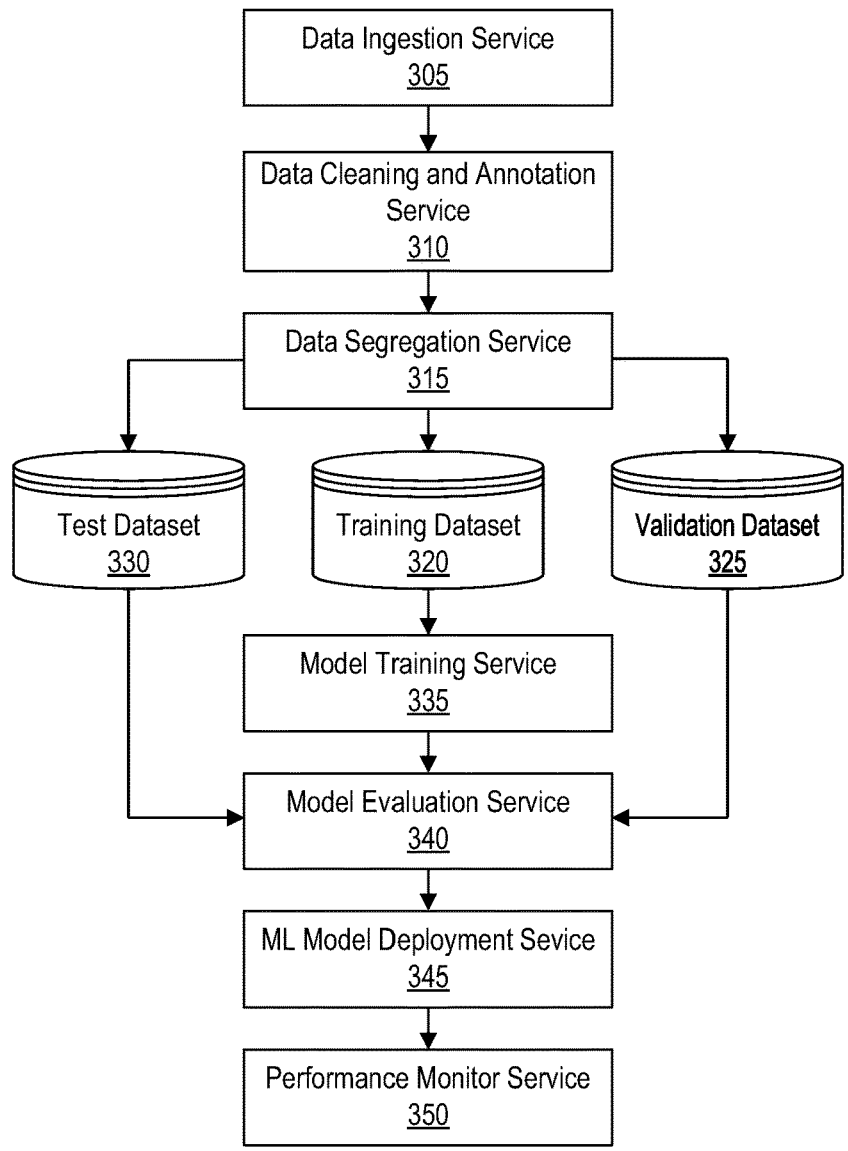
FIG. 3 illustrates an example lifecycle of a machine learning (ML) model in accordance with some aspects of the present technology.

FIG. 3 illustrates an example lifecycle 300 of an ML model in accordance with some examples. The first stage of the lifecycle 300 of an ML model is a data ingestion service 305 to generate datasets described below. ML models require a significant amount of data for the various processes described in FIG. 3 and the data persisted without undertaking any transformation to have an immutable record of the original dataset. The data itself can be generated by sensors attached to an AV, for example, but can also be provided from third-party sources such as publicly available dedicated datasets used for research purposes. The data ingestion service 305 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data (e.g., an AV) from the consumer of the data (e.g., an ML model training pipeline). For offline data production, when source data is available from the producer (e.g., the AV), the producer publishes a message and the data ingestion service 305 retrieves the data. In some examples, the data ingestion service 305 may be online and the data is streamed from the producer (e.g., the AV) in real-time for storage in the data ingestion service 305.

After data ingestion service 305, a data preprocessing service preprocesses the data to prepare the data for use in the lifecycle 300 and includes at least data cleaning, data transformation, and data selection operations. The data preprocessing service 310 removes irrelevant data (data cleaning) and general preprocessing to transform the data into a usable form. In some examples, the data preprocessing service 310 may convert 3D LIDAR data (e.g., 3D point cloud data) into voxels. The data preprocessing service 310 includes labeling of features relevant to the ML model such as people, vegetation, vehicles, and structural objects in the case of an AV. In some examples, the data preprocessing service 310 may be a semi-supervised process performed by an ML to clean and annotate data that is complemented with manual operations such as labeling of error scenarios, identification of untrained features, etc.

After the data preprocessing service 310, data segregation service 315 separates data into at least a training dataset 320, a validation dataset 325, and a test dataset 330. Each of the training dataset 320, a validation dataset 325, and a test dataset 330 are distinct and do not include any common data to ensure that evaluation of the ML model is isolated from the training of the ML model.

The training dataset 320 is provided to a model training service 335 that uses a supervisor to perform the training, or the initial fitting of parameters (e.g., weights of connections between neurons in artificial neural networks) of the ML model. The model training service 335 trains the ML model based on a gradient descent or stochastic gradient descent to fit the ML model based on an input vector (or scalar) and a corresponding output vector (or scalar). In some embodiments, training dataset 320 can comprise various simulated scenes including simulated scene 200 as described above with reference to FIG. 2.

After training, the ML model is evaluated at a model evaluation service 340 using data from the validation dataset 325 and different evaluators to tune the hyperparameters of the ML model. The predictive performance of the ML model is evaluated based on predictions on the validation dataset 325 and iteratively tunes the hyperparameters based on the different evaluators until the best fit for the ML model is identified. After the best fit is identified, the test dataset 330, or holdout data set, is used as a final check to perform an unbiased measurement on the performance of the final ML model by the model evaluation service 340. In some cases, the final dataset that is used for the final unbiased measurement can be referred to as the validation dataset and the dataset used for hyperparameter tuning can be referred to as the test dataset.

After the ML model has been evaluated by the model evaluation service 340, an ML model deployment service 345 can deploy the ML model into an application or a suitable device. The deployment can be into a further test environment such as a simulation environment, or into another controlled environment to further test the ML model. In the case of an AV, the ML model may need to undergo further evaluation inside a simulated environment and, after further validation, could be deployed in the AV. In some examples, the ML model could be implemented as part of the perception stack 112 to detect objects.

After deployment by the ML model deployment service 345, a performance monitor service 350 monitors for the performance of the ML model. In some cases, the performance monitor service 350 can also record performance data such as driving data that can be ingested via the data ingestion service 305 to provide further data, additional scenarios, and further enhance the training of ML models.

Figure 4:
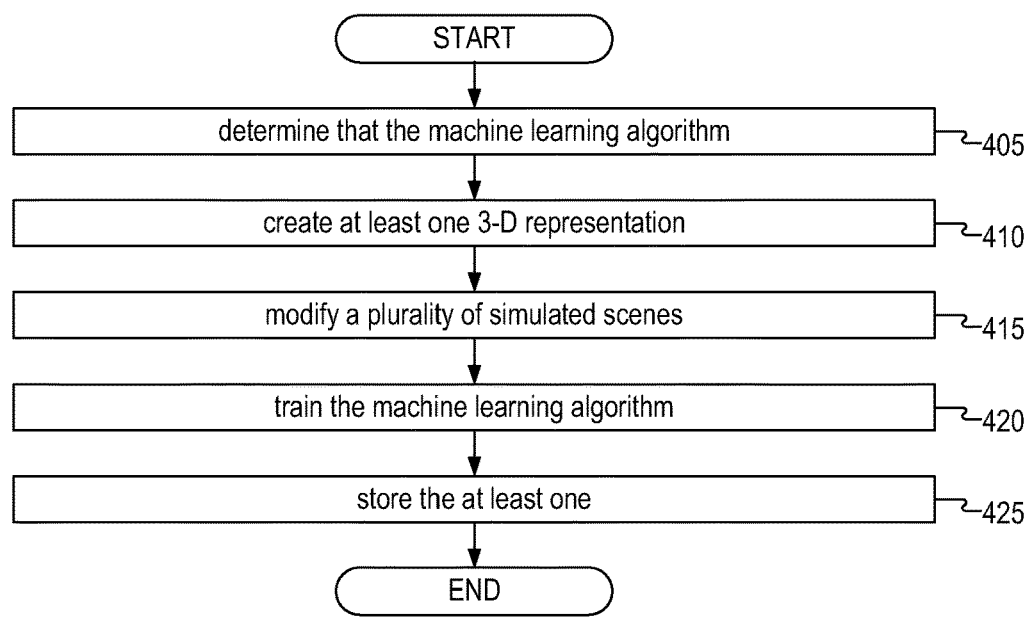
FIG. 4 is a flowchart of a method for improving performance of a machine learning algorithm in accordance with some aspects of the present technology.

FIG. 4 illustrates an example method 400 for improving performance of a machine learning algorithm that at least receives data descriptive of a 3-D object and provides an output, where the 3-D object occurs infrequently in a training dataset. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, method 400 includes determining 405 that the machine learning algorithm performed below a threshold performance score when receiving data descriptive of the 3-D object in a real-world scene. For example, AI/ML platform 154 illustrated in FIG. 1 may determine that the machine learning algorithm performed below a threshold performance score when receive data descriptive of the 3-D object in a real-world scene. The threshold performance score can be indicative of an accuracy or performance of the machine learning algorithm in detecting and/or identifying the 3-D object. In some embodiments, the 3-D object is classified as a first type of object. For example, the 3-D object may be a dumpster classified as a dumpster. In other words, the classification can provide a semantic label for the machine learning algorithm to associate with the 3-D object. In some embodiments, the data descriptive of the 3-D object in a real-world is Light Detection and Ranging (LiDAR) point cloud data.

According to some embodiments, method 400 includes creating 410 at least one 3-D representation of the first type of object for use in a simulation or simulated scene. For example, AI/ML platform 154 illustrated in FIG. 1 may create at least one 3-D representation of the first type of object for use in a simulation or simulated scene.

In one aspect, creating 410 the at least one 3-D representation of the first type of object for use in a simulation or simulated scene can include searching a database of saved real-world scenarios for objects classified as the first type of object in the saved real-world scenarios, the saved-real world scenarios including LiDAR data associated with the first type of object. For example, AI/ML platform 154 illustrated in FIG. 1 may search a database of saved real-world scenarios for objects classified as the first type of object in the saved real-world scenarios, the saved-real world scenarios including LiDAR data associated with the first type of object. In some embodiments, searching the database can include matching camera images of the at least one 3-D representation of the object to LiDAR data to find instances of the at least one 3-D representation of the object.

Additionally, creating 410 the at least one 3-D representation of the first type of object for use in a simulation or simulated scene can also include generating the 3-D representation of the first type of object from the LiDAR data associated with the first type of object. For example, AI/ML platform 154 illustrated in FIG. 1 may generate the 3-D representation of the first type of object from the LiDAR data associated with the first type of object.

Method 400 includes modifying 415 a plurality of simulated scenes to include the at least one 3-D representation of the first type of object. For example, AI/ML platform 154 illustrated in FIG. 1 may modify a plurality of simulated scenes to include the at least one 3-D representation of the first type of object.

In one aspect, modifying 415 the plurality of scenes to include the at least one 3-D representation of the first type of object can include varying a pose of the at least one 3-D representation of the first type of object across the plurality of simulated scenes. For example, AI/ML platform 154 illustrated in FIG. 1 may vary a pose of the at least one 3-D representation of the first type of object across the plurality of simulated scenes. In other words, perspectives of the 3-D representation of the first type of object can be varied.

In one aspect, modifying 415 the plurality of scenes to include the at least one 3-D representation of the first type of object can include varying a distance of the at least one 3-D representation of the first type of object relative to a simulated sensor capturing the data descriptive of the 3-D representation of the first type of object. For example, AI/ML platform 154 illustrated in FIG. 1 may vary a distance of the at least one 3-D representation of the first type of object relative to a simulated sensor capturing the data descriptive of the 3-D representation of the first type of object. In other words, a distance or location of the 3-D representation of the first type of object can be varied.

In one aspect, modifying 415 the plurality of scenes to include the at least one 3-D representation of the first type of object can include modifying the plurality of simulated scenes based on one or more criteria. For example, AI/ML platform 154 illustrated in FIG. 1 may modify the plurality of simulated scenes based on one or more criteria. In some embodiments, the one or more criteria specifies where objects of the first type of object should be located within the plurality of simulated scenes. In some embodiments, the one or more criteria specifies a ratio of the plurality of simulated scenes that are modified to include the first type of object to the total number of simulated scenes. In some embodiments, the plurality of scenes can be weighted to meet a desired ratio of scenes with the at least one 3-D representation of the first type of object to a total number of scenes and/or a number of scenes without the at least one 3-D representation of the first type of object. The ratio can be tuned based on various different factors including, but not limited to, a real-world frequency of occurrence, an oversample frequency, an undersample frequency, an equilibrium, etc. For example, specified garbage days may occur once a week, so the plurality of simulated scenes can be weighted to have a ratio of one scene with the at least one 3-D representation of the first type of object to a total of seven scenes. Additionally, the plurality of simulated scenes can be a subset of a total number of scenes and/or simulated scenes, such that the ratio of the plurality of simulated scenes that are modified to include the first type of object to the total number of simulated scenes is specified by the one or more criteria.

Method 400 includes training 420 the machine learning algorithm with the modified simulated scenes, whereby the machine learning algorithm has greater exposure to the first type of object. For example, AI/ML platform 154 illustrated in FIG. 1 may train the machine learning algorithm with the modified simulated scenes, whereby the machine learning algorithm has greater exposure to the first type of object. In some embodiments, the machine learning algorithm is part of an autonomous vehicle (AV) computing stack of an AV responsible for receiving data from at least one sensor and providing outputs effective to control actuators to autonomously pilot the AV.

Method 400 includes storing 425 the at least one created 3-D representation of the first type of object for use in the simulation in a database of the first type of object. For example, AI/ML platform 154 illustrated in FIG. 1 may store the at least one created 3-D representation of the first type of object for use in the simulation in a database of the first type of object. In some embodiments, the at least one 3-D representation of the first type of object is one of a plurality of the first type of object in the database.

FIG. 5 shows an example of computing system 500, which can be for example any computing device making up autonomous vehicle 102, internal computing system 110, data center 150, client computing device 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:
   determining that a machine learning algorithm performed below a threshold performance score when receiving data descriptive of a 3-D object in a real-world scene, wherein the 3-D object is classified as a first type of object;
   determining that the first type of object corresponds to a long-tail object, wherein the long-tail object has a low frequency of occurrence relative to other objects in a training dataset used to train the machine learning algorithm;
   searching a database of saved real-world scenarios to identify objects classified as the first type of object in the saved real-world scenarios, wherein the saved real-world scenarios include sensor data associated with the first type of object;
   generating at least one 3-D representation of the first type of object from the sensor data associated with the first type of object;
   modifying a plurality of simulated scenes to include the at least one 3-D representation of the first type of object to yield a plurality of modified simulated scenes; and
   training the machine learning algorithm with the plurality of modified simulated scenes, whereby the machine learning algorithm has greater exposure to the first type of object.

2. The computer-implemented method of claim 1, wherein modifying the plurality of simulated scenes to include the at least one 3-D representation of the first type of object further comprises:
   varying a pose of the at least one 3-D representation of the first type of object across the plurality of simulated scenes.

3. The computer-implemented method of claim 1, wherein modifying the plurality of simulated scenes to include the at least one 3-D representation of the first type of object further comprises:
   varying a distance of the at least one 3-D representation of the first type of object relative to a simulated sensor capturing the data descriptive of the at least one 3-D representation of the first type of object.

4. The computer-implemented method of claim 1, wherein the data descriptive of the 3-D object in the real-world scene is Light Detection and Ranging (LiDAR) point cloud data.

5. The computer-implemented method of claim 1, wherein the machine learning algorithm is part of an autonomous vehicle (AV) computing stack of an AV responsible for receiving data from at least one sensor and providing outputs effective to control actuators to autonomously pilot the AV.

6. The computer-implemented method of claim 1, further comprising:
   storing the at least one 3 D representation of the first type of object for use in a database of the first type of object, wherein the at least one 3-D representation of the first type of object is one of a plurality of the first type of object in the database.

7. The computer-implemented method of claim 6, further comprising:
   randomly selecting one of the first type of object from the database each time a simulated scene is to be modified to include at least one 3-D representation of the plurality of the first type of object.

8. The computer-implemented method of claim 1, wherein modifying the plurality of simulated scenes to include the at least one 3-D representation of the first type of object further comprises:
   modifying the plurality of simulated scenes based on one or more criteria.

9. The computer-implemented method of claim 8, wherein the one or more criteria specifies where objects of the first type of object should be located within the plurality of simulated scenes.

10. The computer-implemented method of claim 8, wherein the plurality of simulated scenes is a subset of a total number of simulated scenes, wherein the one or more criteria specifies a ratio of the plurality of simulated scenes that are modified to include the first type of object to the total number of simulated scenes.

11. A system comprising:
    a memory configured to store instructions; and
    a processor configured to execute the instructions and cause the processor to:
       determine that a machine learning algorithm performed below a threshold performance score when receiving data descriptive of a 3-D object in a real-world scene, wherein the 3-D object is classified as a first type of object;
       determine that the first type of object corresponds to a long-tail object, wherein the long-tail object has a low frequency of occurrence relative to other objects in a training dataset used to train the machine learning algorithm;
       search a database of saved real-world scenarios to identify objects classified as the first type of object in the saved real-world scenarios, wherein the saved real-world scenarios include sensor data associated with the first type of object;
       generate at least one 3-D representation of the first type of object from the sensor data associated with the first type of object;
       modify a plurality of simulated scenes to include the at least one 3-D representation of the first type of object to yield a plurality of modified simulated scenes; and
       train the machine learning algorithm with the plurality of modified simulated scenes, whereby the machine learning algorithm has greater exposure to the first type of object.

12. The system of claim 11, wherein the processor is configured to execute the instructions and cause the processor to:
    vary a pose of the at least one 3-D representation of the first type of object across the plurality of simulated scenes.

13. The system of claim 11, wherein the processor is configured to execute the instructions and cause the processor to:

vary a distance of the at least one 3-D representation of the first type of object relative to a simulated sensor capturing the data descriptive of the at least one 3-D representation of the first type of object.

14. The system of claim 11, wherein the data descriptive of the 3-D object in the real-world scene is Light Detection and Ranging (LiDAR) point cloud data.

15. The system of claim 11, wherein the machine learning algorithm is part of an autonomous vehicle (AV) computing stack of an AV responsible for receiving data from at least one sensor and providing outputs effective to control actuators to autonomously pilot the AV.

16. A non-transitory computer readable medium comprising instructions, the instructions, when executed by a computing system, cause the computing system to:
    determine that a machine learning algorithm performed below a threshold performance score when receiving data descriptive of a 3-D object in a real-world scene, wherein the 3-D object is classified as a first type of object;
    determine that the first type of object corresponds to a long-tail object, wherein the long-tail object has a low frequency of occurrence relative to other objects in a training dataset used to train the machine learning algorithm;
    search a database of saved real-world scenarios to identify objects classified as the first type of object in the saved real-world scenarios, wherein the saved real-world scenarios include sensor data associated with the first type of object;
    generate at least one 3-D representation of the first type of object from the sensor data associated with the first type of object;
    modify a plurality of simulated scenes to include the at least one 3-D representation of the first type of object to yield a plurality of modified simulated scenes; and
    train the machine learning algorithm with the plurality of modified simulated scenes, whereby the machine learning algorithm has greater exposure to the first type of object.

17. The non-transitory computer readable medium of claim 16, further comprising instructions that, when executed by the computing system, cause the computing system to:
    vary a pose of the at least one 3-D representation of the first type of object across the plurality of simulated scenes.

18. The non-transitory computer readable medium of claim 16 further comprising instructions that, when executed by the computing system, cause the computing system to:
    vary a distance of the at least one 3-D representation of the first type of object relative to a simulated sensor capturing the data descriptive of the at least one 3-D representation of the first type of object.

19. The non-transitory computer readable medium of claim 16, wherein the data descriptive of the 3-D object in the real-world scene is Light Detection and Ranging (LiDAR) point cloud data.

* * * * *